United States Patent [19]
Ooki et al.

[11] Patent Number: 4,793,746
[45] Date of Patent: Dec. 27, 1988

[54] BORING DEVICE

[75] Inventors: Yasumasa Ooki; Osamu Asano; Toshio Mikiya, all of Tokyo, Japan

[73] Assignee: Nitto Kohki Co., Ltd., Tokyo, Japan

[21] Appl. No.: 186,228

[22] Filed: Apr. 26, 1988

Related U.S. Application Data

[62] Division of Ser. No. 82,351, Aug. 6, 1987.

[30] Foreign Application Priority Data

Sep. 9, 1986 [JP] Japan .................. 61-210603
Sep. 9, 1986 [JP] Japan .................. 61-210604

[51] Int. Cl.$^4$ ............................................ B23B 47/34
[52] U.S. Cl. ............................... 408/17; 74/22 R; 173/104; 173/123
[58] Field of Search .......... 408/17, 703; 74/22 R; 173/48, 104, 109, 123, 124

[56] References Cited

U.S. PATENT DOCUMENTS

| | | |
|---|---|---|
| 2,358,929 | 1/1949 | Clark et al. |
| 2,474,720 | 6/1949 | Billeter . |
| 2,514,758 | 7/1950 | Hallden . |
| 2,514,759 | 7/1950 | Hallden . |
| 2,630,723 | 3/1953 | Gridley .................. 408/17 |
| 3,003,372 | 10/1961 | Findley . |
| 3,018,674 | 1/1962 | Kohler . |
| 3,028,771 | 4/1962 | Bunnell . |
| 3,119,274 | 1/1964 | Short . |

FOREIGN PATENT DOCUMENTS

| | | |
|---|---|---|
| 238880 | 5/1960 | Australia . |
| 580700 | 8/1959 | Canada . |
| 880638 | 11/1981 | U.S.S.R. . |
| 834858 | 5/1960 | United Kingdom . |

*Primary Examiner*—Gil Weidenfeld
*Assistant Examiner*—Daniel W. Howell
*Attorney, Agent, or Firm*—Nixon & Vanderhye

[57] ABSTRACT

A boring device includes a casing and an upwardly biased tool spindle supported in the casing so as to move in a feed direction and a return direction opposite thereto. A first thrust ring with a track surface is disposed coaxial with the tool spindle and is fixed thereto. A second thrust ring with a track surface is also disposed coaxial with the tool spindle and fixed to the casing such that the track surfaces of the first and second thrust rings face each other. A rolling element retaining ring is provided coaxially with the tool spindle between the first and second thrust rings and has bores circumferentially arranged at predetermined angular intervals. Rolling elements are fitted in the bores of the rolling element retaining ring such that the rolling elements roll on the track surfaces of the first and second thrust rings. Receptacles complementary to the bores are formed in the track surface of the first thrust member. A coupling mechanism is provided to allow the rolling element retaining member to directly or operatively engage with the second thrust ring and disengage therefrom.

3 Claims, 11 Drawing Sheets

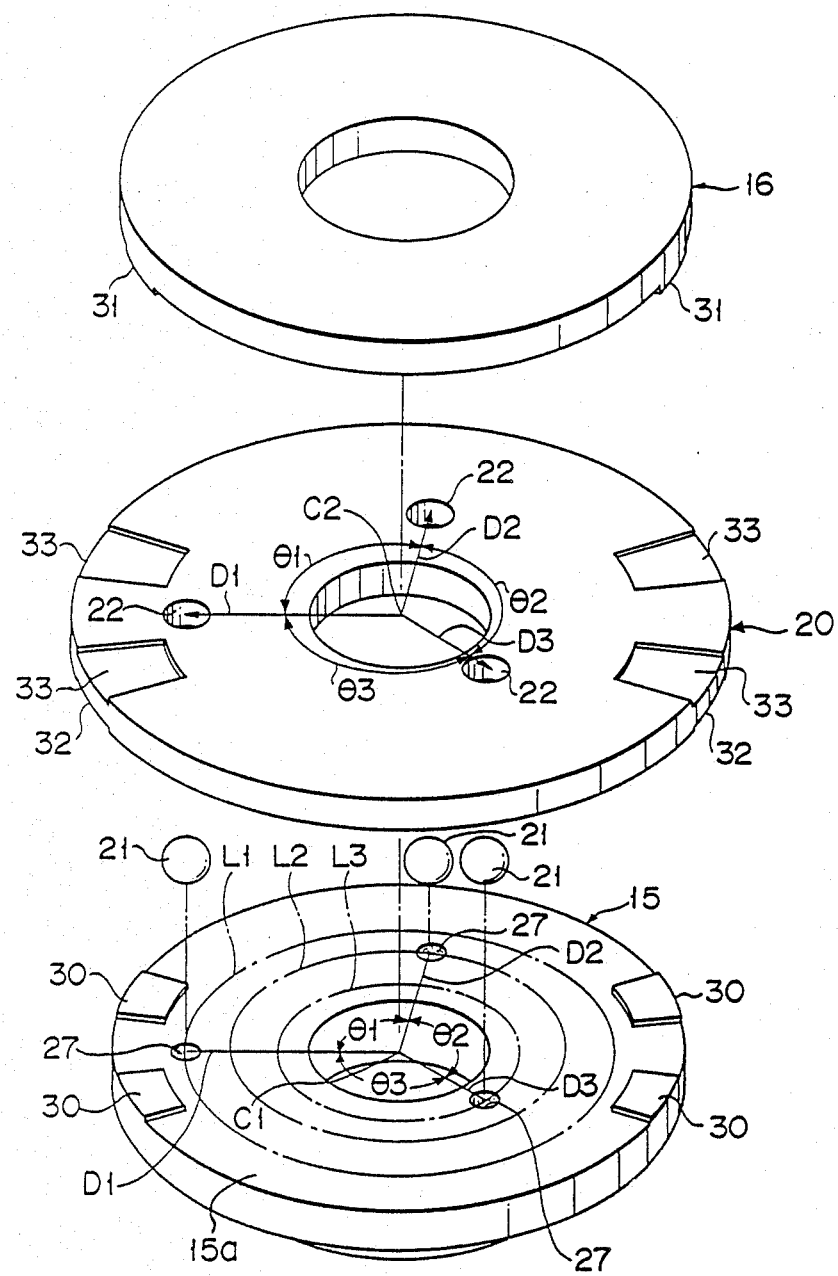
F I G. 4

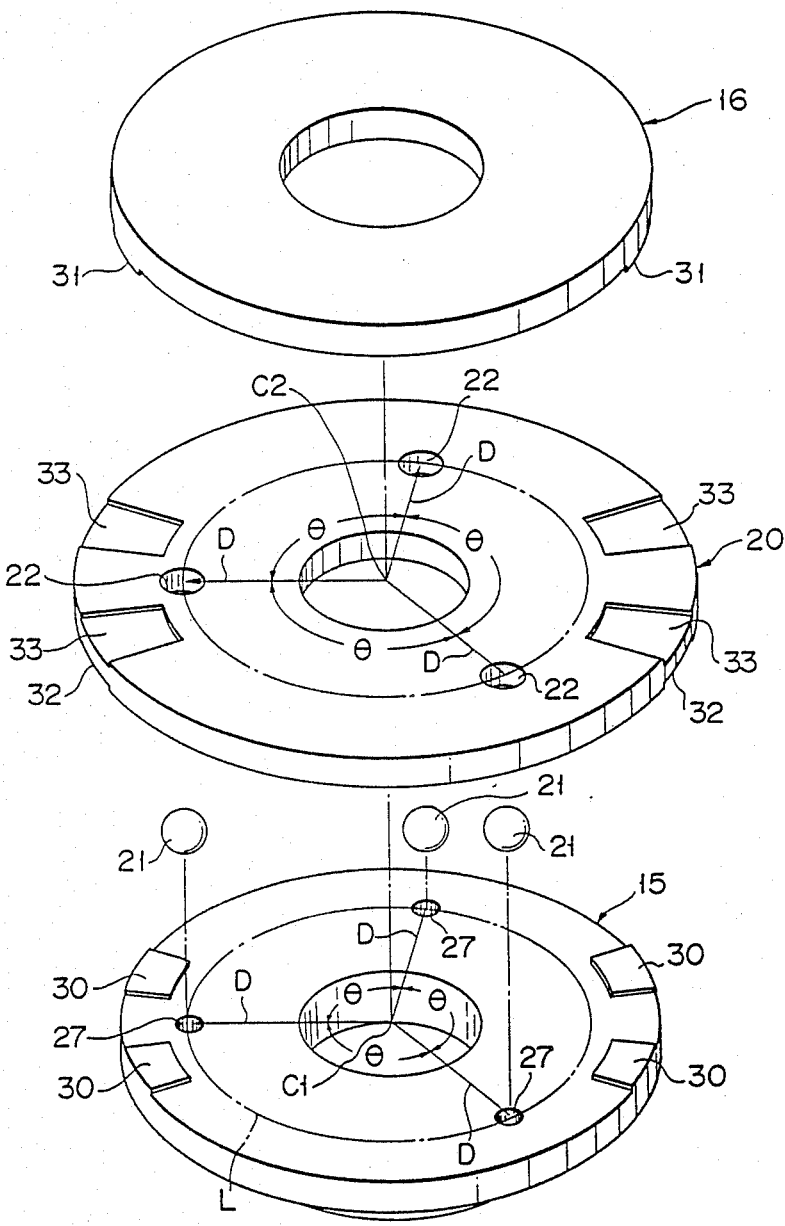
F I G. 8

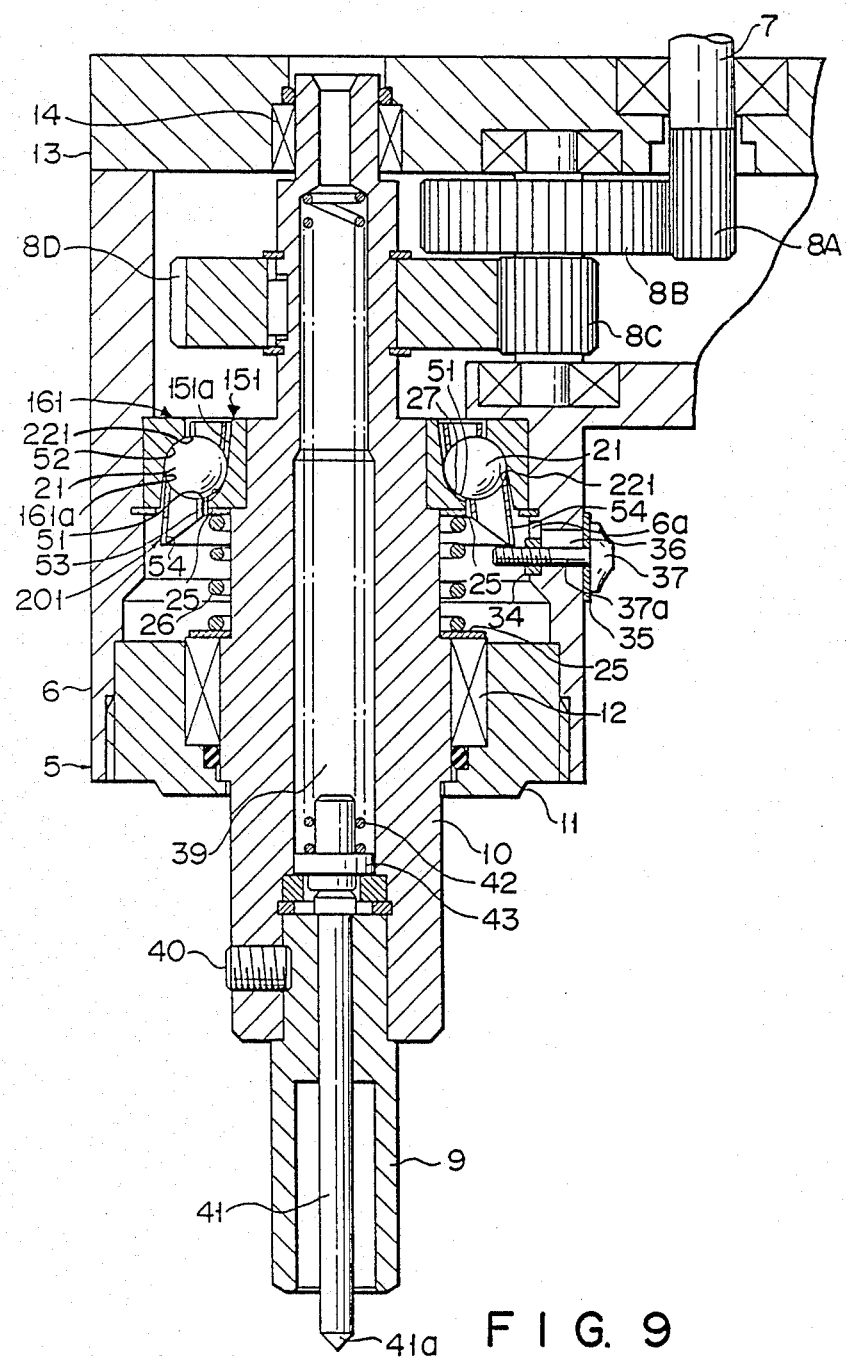
F I G. 9

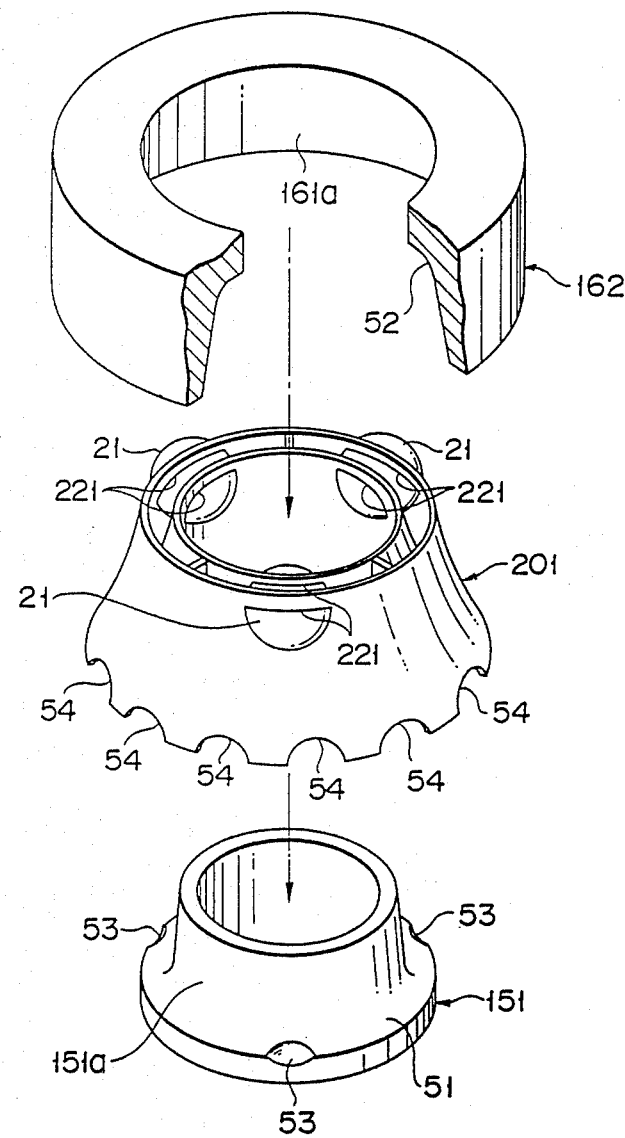
F I G. 13

BORING DEVICE

This is a division of application Ser. No. 082,351, filed Aug. 6, 1987.

BACKGROUND OF THE INVENTION

1. Field of the invention

This invention relates to a boring device, and more particularly to a drilling machine with an improved efficiency for removing chips formed by a boring tool.

2. Description of Related Art

A boring tool such as an annular cutter or a twist drill which has cutting edges at its tip is formed with flutes in its outer peripheral wall which are continuous with the cutting edges. Chips formed during the boring operation are taken out of the hole along the flutes. Chips are broken at such a length as is determined by the material of a workpiece, a cutting speed and a feed speed of the tool, and other factors.

When a thrust is applied to the boring tool at a substantially constant feed speed, the chips are relatively long. As the chips are continuously formed, their weight and removal resistance increase, lowering the chip removal efficiency of the tool. Thus, chips are clogged in the spaces between the flutes and a hole being bored. The increased cutting resistance impairs the free cutting performance, reducing the boring efficiency, and the cutting edges are undesirably worn out. Further, friction heat makes the cutting edges soft.

In order to solve the above problems, there has been proposed a chip breaking member fixed to a drill casing disposed above the cutting tool such that the breaking member hits against a continuous chip to forcibly break the same due to impact or resistance given by the breaking member.

When such a chip breaking member is disposed adjacent to the boring tool, however, it hinders the boring operation. In addition, the continuous chip may take a helical shape or meander. Thus, it is not assured that the breaking member hits against the chip. The chips may be continuously removed without being broken.

Further, the usage of a gun drill has been proposed. The gun drill supplies cutting oil under a high pressure through the boring tool to chips being removed so that the cutting oil causes the chips to flow out of the spaces between the flutes and the hole. However, this requires a special tool or a tool head. Therefore, this proposal is not suitable for a boring device such as a portable drill press or a relatively small drilling machine.

U.S. Pat. Nos. 2,458,929, 2,514,758, 2,514,759 and 2,474,720 disclose drill presses each provided with a chip breaker which performs chip breaking during the return movement of the spindle. However, each of these chip breakers breaks the chip into pieces having one set length, and thus lack the flexibility to break the chip into a plurality of lengths, a given length being chosen in accordance with the prevailing boring conditions.

SUMMARY OF THE INVENTION

It is an object of the present invention to provide a boring device for selecting an appropriate cutting length for the chip in accordance with boring conditions, and smoothly removing the thus broken chip pieces from a hole being formed in a workpiece.

In order to achieve the above object of the present invention, there is provided a boring device comprising a casing, a tool spindle supported in the casing so as to be axially moved in an axial feed direction and in an axial return direction opposite thereto and biased by a spring in the axial return direction. Between the casing and the tool spindle, a first thrust member is provided coaxial with the tool spindle and fixed thereto. The first thrust member has a circumferentially extending track surface. Between the casing and the tool spindle a second thrust member is also provided coaxially with the tool spindle and fixed to the casing. The second thrust member has a circumferentially extending track surface facing the track surface of the first thrust member. A rolling element retaining member is disposed between the first and second thrust members and has at least three rolling element receiving bores which are arranged to be opposed to the track surfaces of the first and second thrust members and to be spaced apart from each other in the circumferential direction. Rolling elements are held in the respective rolling element receiving bores such that the rolling elements project from the rolling element receiving bores. Receptacles are formed in the track surface of either the first thrust member or the second thrust member in the same arrangement as the rolling element receiving bores such that the receptacles simultaneously receive the rolling elements. A coupling mechanism for allowing the rolling element retaining member to be engaged with the thrust member which is not formed with the receptacles and disengaged therefrom.

The mechanism has such a structure that it causes the rolling element retaining member to be engaged with the thrust member having the receptacles and disengaged therefrom.

In the boring device according to a preferred embodiment of the present invention, a tool spindle having a lower end receiving the shank of the boring tool is provided on the casing so as to be axially reciprocated. Two axially opposed thrust rings are fixed to the tool spindle and the casing, respectively. At least three rolling elements are disposed between the thrust rings in rolling contact therewith and are separated circumferentially of the thrust members through predetermined angles by a rolling element retaining ring. The rolling element retaining ring is supported on the tool spindle such that the retaining ring is selectively connected to one of the thrust rings and free from both thrust rings. A plurality of receptacles are formed in the track surface on the other thrust ring. The receptacles are arranged in the same angular relation as that of the rolling elements and are simultaneously engaged by the rolling elements every time the tool spindle rotates through a predetermined angle.

According to another preferred embodiment, the rolling element retaining ring can also be connected to the other thrust ring such that the tool spindle is not intermittently moved in the return direction, while a hole is being formed in a workpiece.

According to still another preferred embodiment, the thrust rings and the rolling element retaining ring are concentrically arranged.

According to the present invention, chips can be broken into pieces having two lengths, a given length being chosen in accordance with the prevailing boring conditions.

BRIEF DESCRIPTION OF THE DRAWINGS

This invention can be fully understood from the following description with reference to the accompanying drawings, in which:

FIG. 4 is an exploded perspective view showing the positional relationship between the rolling elements and the first and second thrust rings of the embodiment shown in FIGS. 1 and 2;

FIG. 8 is an exploded perspective view showing the positional relationship between rolling elements and first and second thrust rings in a boring device according to a second embodiment of the present invention;

FIG. 9 is a longitudinal sectional view of the main part of a boring device according to a third embodiment, showing a state wherein rolling elements are in rolling contact with the track surfaces of the thrust rings and a rolling element retaining ring rotates with respect to a second thrust ring;

FIG. 13 is an exploded perspective view showing the positional relationship between the rolling elements and the first and second thrust rings according to the third embodiment.

DESCRIPTION OF THE PREFERRED EMBODIMENTS

Figure 1:
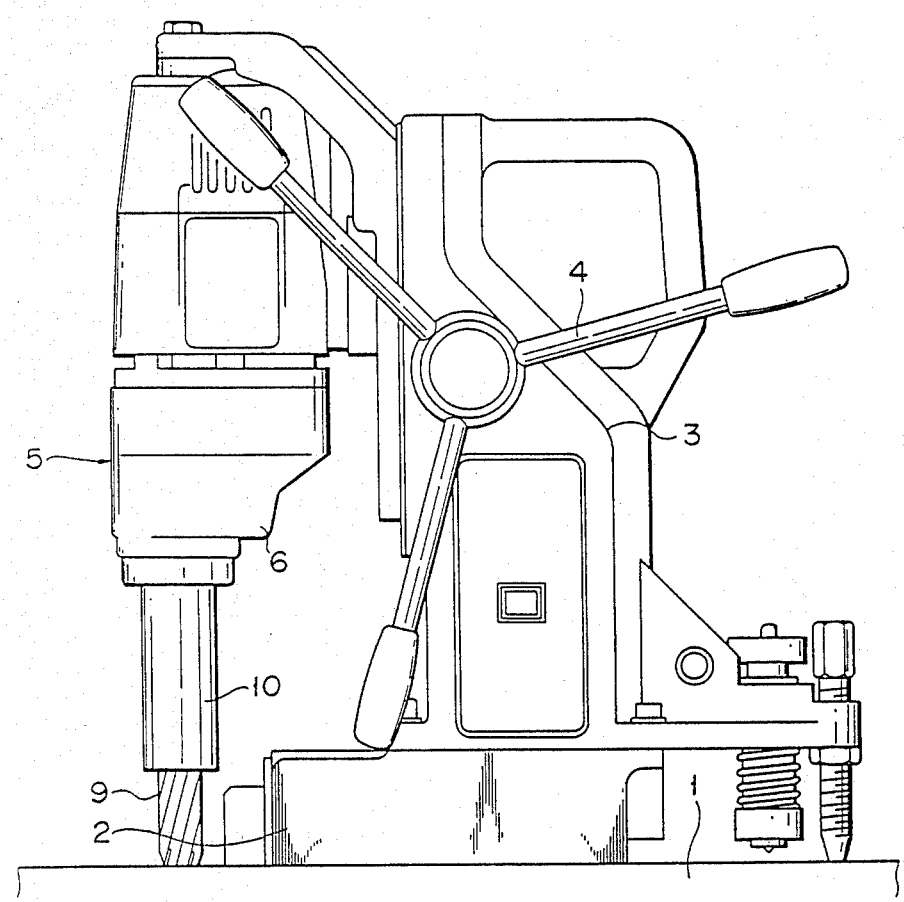
FIG. 1 is a right hand side elevational view of a drilling machine to which the present invention is applied.

Referring to FIG. 1, a drilling machine includes electromagnetic base 2 for electromagnetically attracting ferromagnetic workpiece 1 in a desired position thereof. Base 2 is located under frame 3. Boring device 5 is supported on the front wall of frame 3 to vertically reciprocate with respect to the workpiece 1 by handle 4 or an automatic feed unit (not shown).

Figure 2:
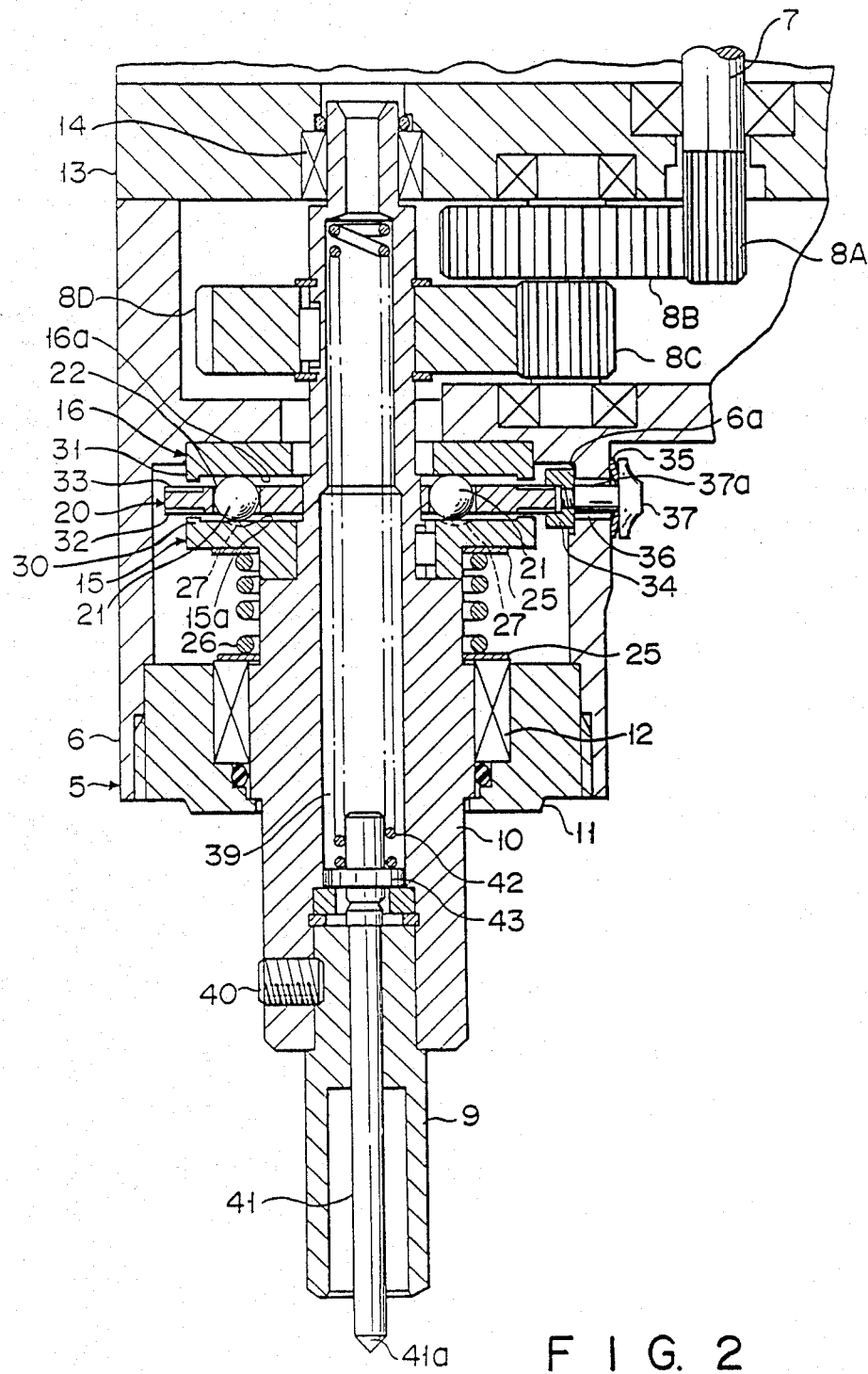
FIG. 2 is a longitudinal sectional view of the main part of a boring device according to a first embodiment, showing a state wherein rolling elements are in rolling contact with respective track surface.
Figure 3:
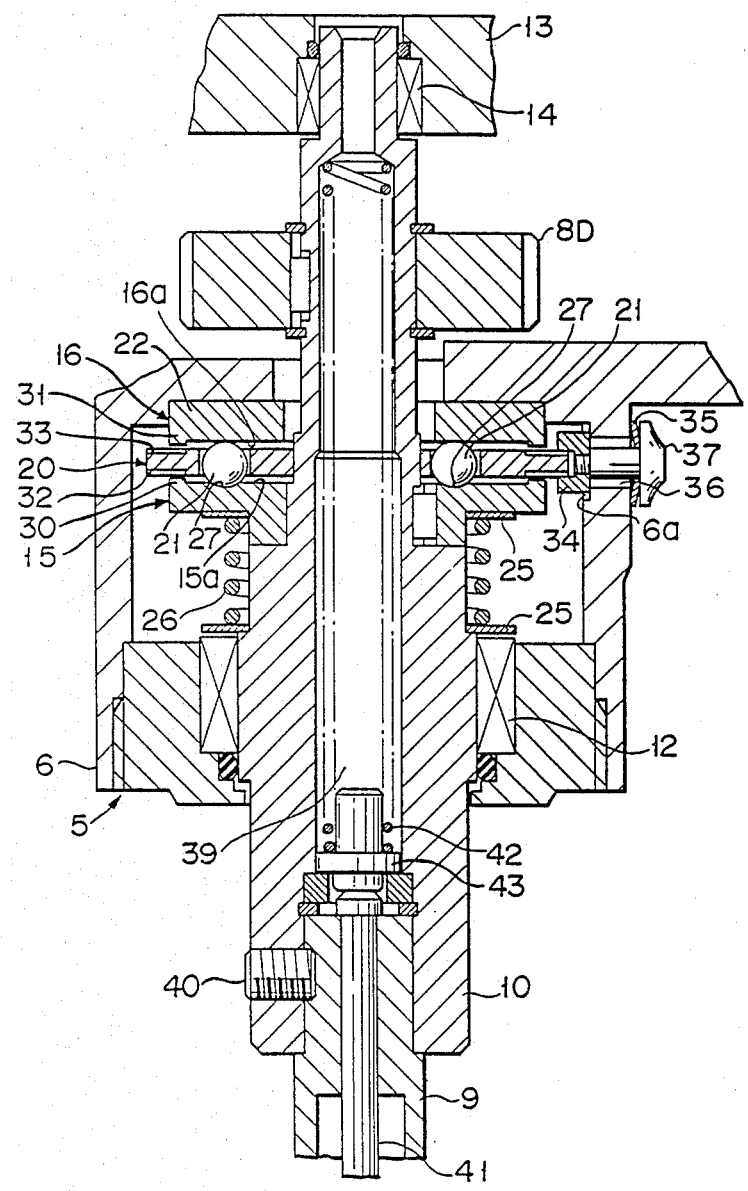
FIG. 3 is a longitudinal sectional view of the embodiment of FIG. 2, showing a state wherein rolling elements engage respective receptacles of a first thrust ring and rolling element retaining ring is not coupled to the first and second thrust rings.

FIGS. 2 to 4 show an embodiment of the present invention.

Casing 6 of boring device 5 houses an electric motor (not shown). Referring to FIG. 2, the rotation of motor shaft 7 reduced by two sets of helical gears 8A to 8D is transmitted to tool spindle 10. Boring tool 9 such as an annular cutter and a drill is detachably mounted in the lower end of tool spindle 10.

The lower end of tool spindle 10 projects from housing block 11 threadably engaged with the lower end of casing 6 and fixed thereto (FIG. 2). An intermediate portion of tool spindle 10 is supported by radial needle bearing 12 mounted in housing block 11. The upper end portion of tool spindle 10 is supported by another radial needle bearing 14 in partition plate 13 of casing 6. The portions of spindle 10 which contact and are supported by the bearings 12 and 14 are respectively slightly longer than the thickness of bearings 12 and 14. Therefore, tool spindle 10 can be slightly reciprocated in the axial direction thereof.

Flange-like thrust ring or first thrust ring 15 in the first embodiment is fixed onto the outer circumferential surface of the portion of spindle 10 between radial needle bearings 12, 14 so as to rotate together with spindle 10. Disk-like thrust ring or second thrust ring 16 is located right above first thrust ring 15 so as to face ring 15 and is separated therefrom by a predetermined distance. The outer circumferential surface of ring 16 is fixed to the inner wall of casing 6, while tool spindle 10 is loosely fitted in the central hole of ring 16.

Ball retaining ring or rolling element retaining ring 20 has ball receiving bores or rolling element receiving bores 22 which receive respective thrust balls 21 as three rolling elements and defines the relative positions of balls 21. Retaining ring 20 is located between thrust rings 15 and 16 and is loosely and rotatably fitted onto the outer surface of tool spindle 10.

As shown in FIG. 4, distances D1, D2, and D3 between center C2 of ring 16 and the centers of bores 22 differ from each other (D1>D2>D3). Center C2 coincides with the axis of tool spindle 10. Central angles $\theta 1$, $\theta 2$, $\theta 3$ are defined by center C2 and the centers of adjacent ball receiving bores 22. Balls 21 are received in ball retaining bores 22 and project from the upper and lower surfaces of receiving ring 20 so as to be in rolling contact with the opposed track surfaces of first and second thrust rings 15 and 16.

As shown in FIG. 2, compression coil spring 26 disposed between bearing 12 and first thrust ring 15 urges ring 15 upwardly via upper spacer 25. The upper end surface of first thrust ring 15 is elastically urged against thrust balls 21. Accordingly, spindle 10 is supported by ring 15 and biased in the thrust direction.

Each of first and second thrust rings 15 and 16 is elastically urged against three thrust balls 21 rolling on different tracks L1, L2 and L3 so as to prevent excessive wear caused by the rolling contact of all thrust balls 21 on a single track. Each of thrust rings 15 and 16 is supported by thrust balls 21 at three points. Central angles $\theta_1$, $\theta_2$, and $\theta_3$ and distances D1, D2, and D3 are adjusted so that total load is applied to the central axis of tool spindle 10. With the above countermeasure, tool spindle 10 can be stably supported and urged in the thrust direction without applying an inclination force to thrust rings 15 add 16, ball retaining ring 20, and thrust balls 21 and without causing eccentric rotation of thrust balls 21 regardless of the spindle speed. Localized wear of individual thrust balls 21 and track surfaces can also be prevented.

As shown in FIG. 4, spherical receptacles or recesses 27 are formed in the regions of corresponding tracks L1, L2 and L3 on which balls 21 roll. Recesses 27 have the same depth and are arranged in the same positional relation as that of thrust balls 21 in retaining ring 20. Namely, central angles extended to the centers of adjacent thrust balls 2 from center C1 are $\theta_1$, $\theta_2$ and $\theta_3$, respectively, and tracks L1, L2 and L3 are separated from center C1 by D1, D2 and D3, respectively. When three thrust balls 21 are simultaneously fitted in recesses 27, first thrust ring 15 and tool spindle 10, which are elastically biased by compression coil spring 26 in the upward direction, i.e., in the return direction, are retracted by a distance equal to the depth of recess 27. The depth of recesses 27 is equal to substantially a maximum allowable thickness of chips formed by boring tool 9. The maximum allowable thickness of chips is determined by the maximum speed of spindle 10 and a maximum allowable feed speed of boring device 5, both of which are defined by a maximum boring capacity of the boring device, as well as the material of work piece 1.

Radial projections 30 and 31 are formed on outer portions of upper end surface or track surface 15a of first thrust ring 15 and lower end surface or track surface 16a of second thrust ring 16. Recesses or receptacles 32 and 33 complementary to projections 30 and 31 are formed in the outer portions of upper and lower end surfaces of ball retaining ring 20.

U-shaped guide piece 34 radially holds the outer peripheral portion of ball retaining ring 20 so that the portion of ring 20 slides on piece 34 when ring 21 rotates. Bolt 37a passes through a vertical elongated hole 36 formed in the skirt of the casing 6 and is threaded in piece 34. Belleville spring 35 is disposed between the outer wall of casing 6 and the inner face of knob 37 integral with bolt 37a. By tightening knob 37, bolt 37a is fixed to casing 6. After knob 37 is loosened, bolt 37a is moved together with knob 37 along hole 6a. Ring 20 is also moved by piece 34 in the same direction as bolt 37a, thereby adjusting the position of ring 20. When ring 20 is lifted, projections 31 of second thrust ring 16 engage recesses 33 of retaining ring 20. On the contrary, lowered ring 20 enables recesses 32 of ring 20 to receive projections 30 of first thrust ring 15. In an intermediate position of retaining ring 20, no engagement occurs between projections 31 and recesses 33 or between projections 30 and recesses 30.

Figure 5:
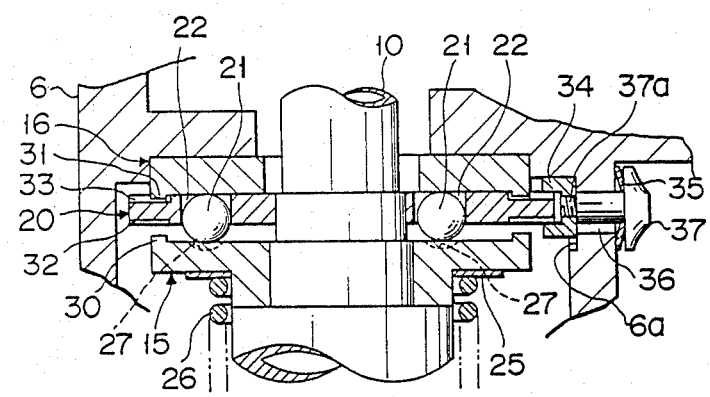
FIG. 5 is a longitudinal sectional view showing a state wherein the rolling element retaining ring is coupled to the second thrust ring and the rolling elements are in rolling contact with the track surfaces of the first and second thrust rings according to the embodiment of FIGS. 1 to 4.
Figure 6:
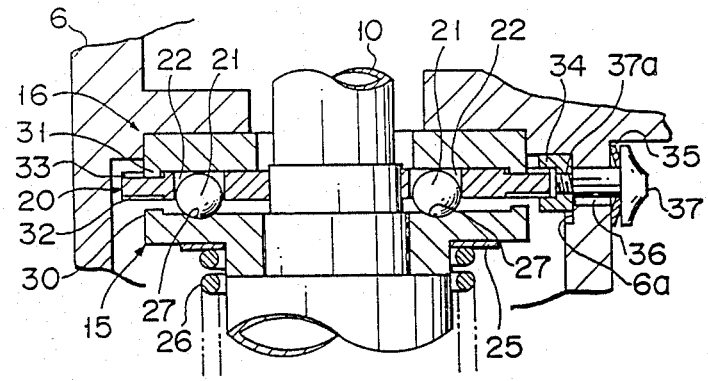
FIG. 6 is a longitudinal sectional view showing a state wherein the rolling element retaining ring is coupled to the second thrust ring and the rolling elements engage the respective receptacles of the first thrust ring according to the embodiment of FIGS. 1 to 4.

When projections 31 engage respective recesses 33, ball retaining ring 20 is coupled with second thrust ring 16, as shown in FIG. 5. As first thrust ring 15 is rotated by tool spindle 10, thrust balls 21 in ring revolves about their axes without changing their position with respect to second thrust ring 16 and are simultaneously fitted in respective recesses 27 once, every time tool spindle 10 rotates first thrust ring 15 once, as shown in FIG. 6. Then, spindle 10 is axially retracted by compression coil spring 26 in the upward direction, i.e., in the return direction. Therefore, tool spindle 10 is moved in the upward direction, i.e., the return direction by a distance equal to the depth of recess 27 once per one revolution of spindle 10 and instantaneously separates the cutting edge from the surface being cut of workpiece 1, thereby instantaneously interrupting cutting. The chip length corresponds to substantially one revolution of boring tool 9.

When projections 31 are disengaged from recesses 33 by lowering ring 20 to its intermediate position as shown in FIG. 2, ball retaining ring 20 is released from thrust rings 15 and 16. As first thrust ring 15 is rotated together with tool spindle 10, thrust balls 21 roll on the track surfaces of first and second thrust rings 15, 16. The distance by which each ball 21 travels on the track surface on first thrust ring 15 is equal to the distance by which the ball 21 rolls on the track surface on second thrust ring 16. As first thrust ring 15 is rotated, therefore, balls 21 rotate about the axis of retaining ring 20 together therewith through half the angle of the rotational angle of first thrust ring 15. As a result, thrust balls 21 instantaneously engage corresponding recesses 27 once, every time first thrust ring 15 rotates twice together with tool spindle 10, and tool spindle 10 slides in the return direction by a distance equal to the depth of recess 27 at the same moment, when the engagement between balls 21 and recesses 27 takes place. The cutting edges of boring tool 9 are separated from the surface in the hole being formed in the workpiece 1 and the cutting operation is instantaneously interrupted. Therefore, the chip is cut into pieces each having a length corresponding to two resolutions of boring tool 9.

Figure 7:
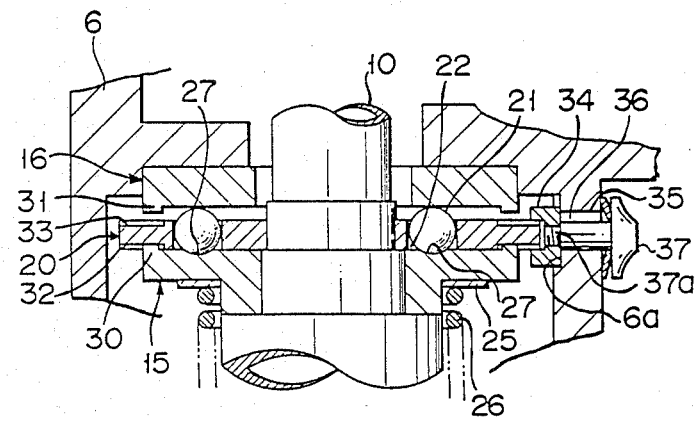
FIG. 7 is a longitudinal sectional view showing a state wherein the rolling element retaining ring is coupled to the first thrust ring according to the embodiment of FIGS. 1 to 4.

When projections 30 engage respective recesses 32 and thrust balls 21 are also received in respective recesses 27 as shown in FIG. 7, ball retaining ring 20 is coupled to first thrust ring 15. Balls 21 in retaining ring 20 are kept fitted in corresponding recesses 27 and revolve about their own axes without changing their positions with respect to first thrust ring 15 and are in rolling contact with the track surface on second thrust ring 16. Therefore, tool spindle 10 fixed by first thrust ring 15 is not axially displaced during its own rotation. In this case, the chip length is not controlled.

An annular cutter can be used as a boring tool 9 and is detachably fixed to cutter arbor 39 of tool spindle 10 by set screw 40. Pilot pin 41 passes through boring tool 9 in alignment with the axis of tool 9 such that pin 41 can extend from or be retracted into the lower end of tool 9. When boring tool 9 is attached to tool spindle 10, the tip 41a of pilot pin 41 is urged by press piece 43 which is urged downward by compression coil spring 42 in cutter arbor 39 of spindle 10. Tip 41a of pilot pin 41 extends from the lower end face of tool 9 and serves as the center thereof. During the boring operation, tip 41a of pin 41 contacts the surface of the workpiece, and pin 41 runs idle. When boring machine 5 is moved to the uppermost position upon completion of boring pilot pin 41 pushes chips from boring tool 9 by the biasing force of compression coil spring 42.

The operation of the first embodiment will be described below.

When the depth of a hole to be cut by boring tool 9 is relative large, loosened operation knob 37 is moved to the center of elongated hole 36, as shown in FIG. 2, so that ball retaining ring 20 is separated from thrust rings 15 and 16. And then knob 37 is retightened to fix guide piece 34 to inner wall surface 6a of casing 6 at the center of hole 36.

When tool spindle 10 is rotated, thrust balls 21 roll on the opposed track surfaces of first and second thrust rings 15 and 16, and balls 21 are rotated together with ring 20 once, every time tool spindle 10 rotates twice. Balls 21 are simultaneously fitted in respective recesses 27 formed in the regions of tracks L1, L2, and L3 once per every two revolutions of spindle 10. Spindle 10 and ring 15 urged upward by compression coil spring 26 are moved upward by a distance equal to the depth of recess 27 in the return direction (upward in FIG. 2). The spindle 10 moves from the state in FIG. 2 to the state in FIG. 3.

During the boring operation, handle 4 or an automatic feeding unit (not shown) feeds boring tool 9 through spindle 10. Upon simultaneous engagement of thrust balls 1 with recesses 27, spindle 10 is moved upward by the above-mentioned distance. This exhibits the same effect that the feeding of boring tool 9 is stopped. Since the axial displacement of spindle 10 is the same as substantially the maximum allowable thickness of the chip, tool 9 temporarily stops cutting workpiece 1. Then, the chip is broken into pieces each having a length corresponding to two revolutions of tool 9, and the thus broken chip pieces are intermittently removed from a hole being formed.

If the cutting diameter of boring tool 9 is large and the boring depth is smaller than those in the first case, operation knob 37 is moved to the upper end of elongated hole 36 to engage projections 31 with recesses 33. Ball retaining ring 20 is coupled to second thrust ring 16. As tool spindle 10 is rotated, thrust balls 21 are rotated about their axes without changing their positions with respect to second thrust ring 16 and are in rolling contact with thrust ring 15. Balls 21 are simultaneously fitted in corresponding recesses 27 once per one revolution of tool spindle 10. First thrust ring 15 fixed to tool spindle 10 are moved by a distance equal to the depth of recess 27 in the return direction, as shown in FIG. 6.

The chip is cut into pieces each having a length corresponding to one revolution of boring tool 9, and the broken chip pieces are intermittently removed from the hole being formed.

There are such cases where chips are not required to be broken, that a work piece is thin, that a work piece is made of such material as cast iron from which continuous chips are not formed, or that a cutting tool has a chip-breaking function although it is poor. In such cases, operation knob 37 is set to the lower end of elongated hole 36 to engage projections 30 with recesses 32, as shown in FIG. 7.

Thrust balls 21 remaining fitted in recesses 27 are rotated together with first thrust ring 15 and roll on the track surface of second thrust ring 16. Tool spindle 10 does not retract during its rotation. In this case, chips are not broken.

When an annular cutter having a relatively large cutting diameter is used in place of the annular cutter in the first embodiment,, two recesses 27 are formed diametrically opposed to each other in the region of each of tracks L1, L2, and L3. Spindle 10 can be selectively retracted once or twice pet one revolution thereof.

FIG. 8 shows a modification of the first embodiment which is usable when first thrust ring 15 is not exerted by a heavy thrust. Three thrust balls 21 roll on a common track L. In the region of track L, three recesses 27 are formed to simultaneously receive respective balls 21 with central angles s equal to each other. Spindle 10 is selectively retracted six or three times per every two revolutions of tool spindle 10.

The number of thrust balls, the number of tracks and the number of recesses are properly selected to make the number of retraction of tool spindle 10 per one revolution thereof be $\frac{1}{2}$ or more.

Recesses 27 may be formed in second thrust ring 16 in place of first thrust ring 15. Ball retaining ring 20 is connected to first thrust ring 15.

A second embodiment is substantially the same as the first embodiment shown in FIGS. 2 to 8, except that the upper end face of flange-like first thrust ring 15 does not have projections 30 and the lower end face of ball or rolling element retaining ring 20 does not have recesses 32. Other arrangements of the second embodiment are the same as those of the first embodiment, this embodiment being not shown in the drawings.

With the second embodiment, tool spindle 10 is also retracted to break the chips every time spindle 10 rotates once or twice. The only exception is that spindle 10 cannot be prevented from retracting when it rotates.

FIGS. 9 to 13 show a third embodiment. The same numerals as in the first embodiment denote the same parts in the third embodiment, and a detailed description thereof will be omitted.

First thrust ring 151 is fixed to tool spindle 10 located above radial needle bearing 12. Upward facing and arcuated track surface 51 having the same radius of curvature of thrust ball 21 is formed on outer circumferential surface 151a of ring 151 to receive a thrust load from balls 21. Second thrust ring 161 is fixed to the inner wall of casing 6. The inner circumferential surface of ring 161 faces track surface 51 and is spaced therefrom by a predetermined distance. Downward facing and arcuated track surface 51 having the same radius of curvature as that of thrust ball 21 is formed on inner circumferential surface 161a of ring 161 to receive the thrust load from balls 21.

Ball or rolling element retaining ring 201 is made of a metal plate and has ball receiving bores 221 at an equal circumferentially angular interval of 120° with respect to the axis of ball retaining ring 20. In other words, the central angles of ball bores 221 are equal to each other. Bores 221 receive three thrust balls 21 at the same circumferential angular interval as bores 221. Balls 21 are partially exposed from the inner and outer circumferential surfaces of ball retaining ring 201 and are in rolling contact with track surfaces 51 and 52.

First thrust ring 151 is upwardly urged through upper spacer 25 by compression coil spring 26 disposed between radial needle bearing 12 and first thrust ring 151. In other words, ring 151 is biased together with tool spindle 10 in a direction away from the work piece 1, i.e., in the return direction. First thrust ring 151 elastically urges thrust balls 21 against second thrust ring 161.

Three spherical recesses or receptacles 53 having the same depth are formed on track surface 51 of first thrust ring 151 at an equal circumferential angular intervals of 120°. When balls 21 are simultaneously fitted in respective recesses 53 during the rotation of spindle 10, spindle 10 fixed to first thrust ring 151 is retracted by a distance equal to the depth of recess 53 (upward in FIG. 9). The depth of recess 53 is the same as that of the first embodiment.

Lower edge portion of ball retaining ring 201 extends downward from the space between first and second thrust rings 151 and 161 and is formed with a plurality of semispherical notches 54. Bolt 37a with knob 37 on its one end is inserted in vertically elongated hole 36 and threaded into guide piece or nut 34 which can slide on the inner wall of casing 6 along elongated hole 36.

Belleville spring 35 is provided between the inner face of knob 37 and the outer wall of casing 6. By loosening knob 37, bolt 37a can be moved to a required position in hole 36. After tightening knob 37, bolt 37a is fixed to casing 6 through nut 34 and spring 35.

When knob 37 is moved upward, bolt 37a engages one of notches 54, thereby coupling retaining ring 201 with casing 6. Thus, ring 201 is stationary with respect to second thrust ring 161.

As first thrust ring 151 rotates together with tool spindle 10, thrust balls 21 revolve about their own axes in the stationary ball retaining ring 201. Balls 21 are fitted in recesses 53 three times per one revolution of first thrust ring 151. Spindle 10 is displaced in the return direction under the biasing force of compression coil spring 26 three times per one revolution of spindle 10 by a distance equal to the depth of recess 53. The cutting edges of boring tool 9 is separated from the face being cut of the hole in the workpiece 1 to interrupt cutting of the workpiece. The chip is therefore cut into pieces each having a length corresponding to ⅓ revolution of boring tool 9.

When bolt 37a is disengaged from notch 54 by lowering knob 37, retaining ring 201 rotates freely with respect to first and second thrust rings 151, 161. When first thrust ring 151 is rotated by tool spindle 10, thrust balls 21 roll on track surfaces 51, 52 of first and second thrust rings 151, 152.

The displacement of first thrust ring 151 relative to thrust balls 21 is equal to the displacement of thrust balls 21 with respect to second thrust ring 161. As first thrust ring 151 is rotated, therefore, retaining ring 201 as well as balls 21 rotates at half the rotational speed of first thrust ring 151. Thrust balls 21 are fitted in corresponding recesses 53 three times every time first thrust ring 151 as well as spindle 10 rotates twice, thereby retracting tool spindle 10. Tool spindle 10 retracts by a distance equal to the depth of recess 53 three times per every two revolutions thereof. The boring operation is thus interrupted and the chip is cut into pieces each having a length corresponding to ⅔ revolution of boring tool 9.

The operation of the third embodiment will be described below.

If the cutting diameter of boring tool 9 is small and the boring depth is relatively large, knob 37 is moved to the lower end of elongated hole 36 to separate bolt 37a of knob 37 from notch 54 of ball retaining ring 20.

As tool spindle 10 is rotated and thrust balls 21 in ball retaining ring 201 roll on track surfaces 51, 52 of first and second thrust rings 151, 161, thrust balls 21 are simultaneously fitted in respective recesses 53 three times per every two revolutions of drill spindle 10. As a result, tool spindle 10 and first thrust ring 151 are moved in the return direction (upward in FIG. 9) by a distance equal to the depth of recess 53 which is a substantial maximum allowable thickness of the chip. Tool spindle 10 is moved from the state in FIG. 9 to the state in FIG. 10.

Figure 10:
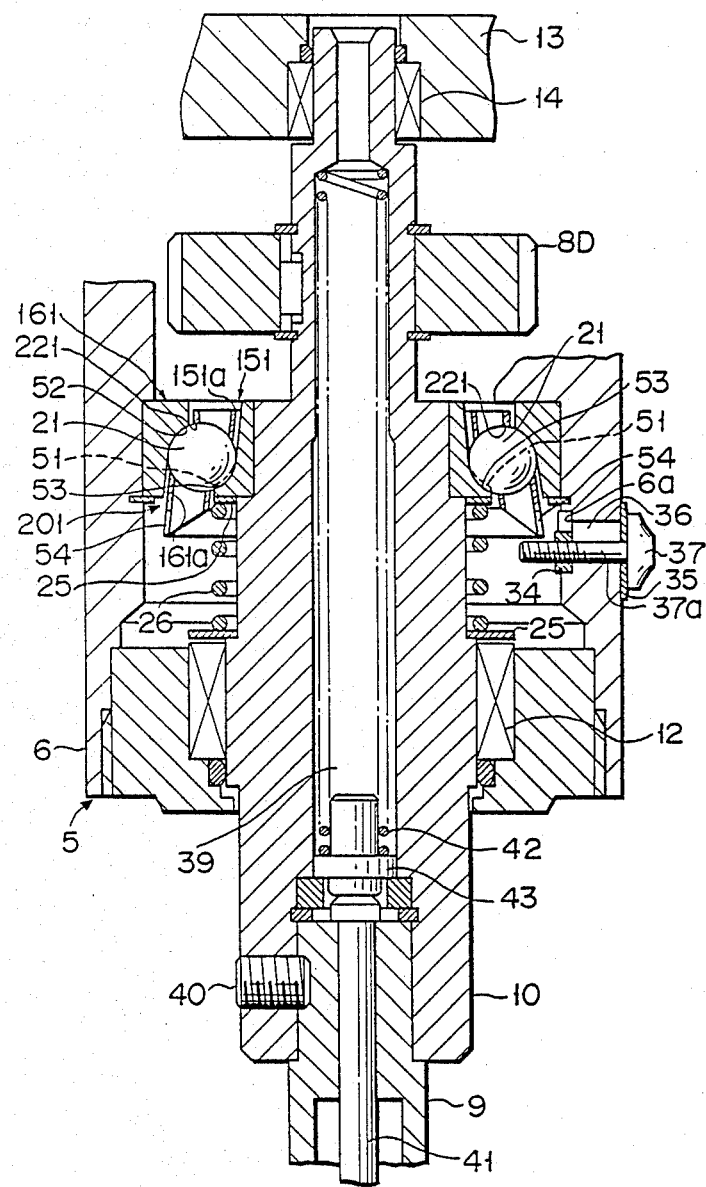
FIG. 10 is a longitudinal sectional view of the embodiment of FIG. 9, showing a state wherein the rolling elements engage the respective receptacles of the first thrust ring with the rolling element retaining ring rotating with respect to the second thrust ring.

The boring operation which is performed by a cutting tool 9 fed to the workpiece 1 by means of handle 4 or an automatic feeding device (not shown) is interrupted in the state shown in FIG. 10. Therefore, the chip is broken into pieces each having a length corresponding to ⅔ revolution of tool 9, and the cut pieces are intermittently removed from a hole being formed.

Figure 11:
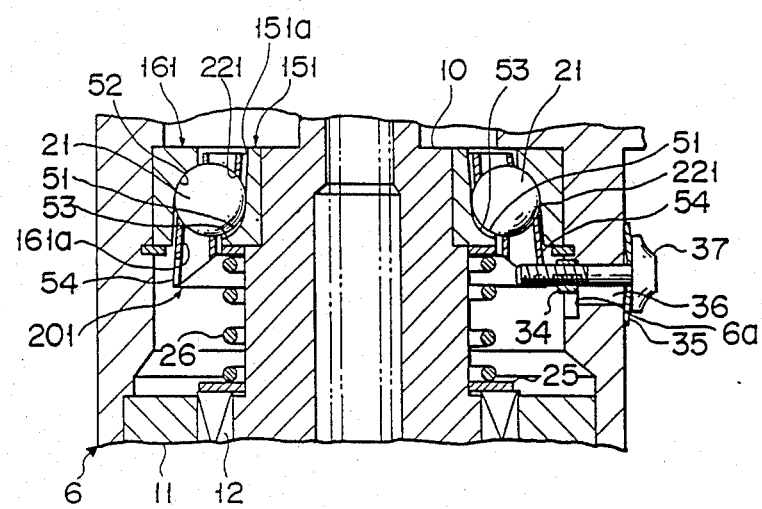
FIG. 11 is a longitudinal sectional view showing a state wherein the rolling element retaining ring is coupled to the casing and are in rolling contact with the track surfaces o the first and second thrust rings according to the third embodiment.
Figure 12:
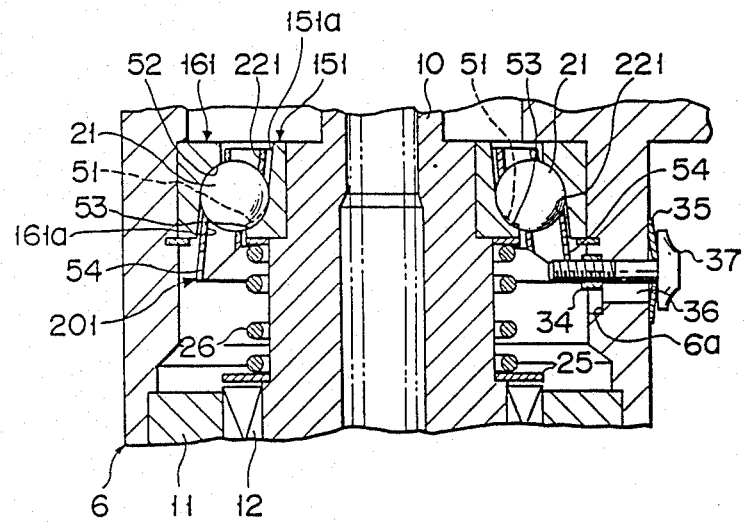
FIG. 12 is a longitudinal sectional view showing a state wherein the rolling element retaining ring is coupled to the casing and the rolling elements engage the respective receptacles of the first thrust ring according to the third embodiment.

If the cutting diameter of boring tool 9 is larger and the cutting depth is smaller than those in the case described above, knob 37 is set to the upper end of elongated hole 36 to engage bolt 37a with one of recesses 54 of ball retaining ring 201, as shown in FIG. 11. Retaining ring 201 is stationary with respect to second thrust ring 111.

As tool spindle 10 is rotated, thrust balls 21 revolve about their own axes without rotating about the axis of retaining ring 201. When balls 21 are simultaneously fitted in respective recesses 53 formed in track surface 51 of first thrust ring 151 three times per one revolution of tool spindle 10, tool spindle 10 as well as first thrust ring 151 are moved by a distance equal to the depth of recess 53 in the return direction. Therefore, tool spindle 10 moves from the state in FIG. 11 to the state in FIG. 12. The chip is broken into pieces each having a length corresponding to ⅓ revolution of boring tool 9, and the cut chip pieces are intermittently removed from the hole being formed.

In the third embodiment, boring tool 9 is moved in the return direction 3 or 6 times per every two revolutions of tool spindle 10. However, if an annular cutter having a relatively large cutting diameter is used, six recesses 53 may be formed in track surface 51 at an equal circumferential angular interval of 60°. Spindle 10 can be selectively retracted three or six times per revolution thereof.

The number of thrust balls and the number of recesses are properly selected to make the number of retraction of the tool spindle per one revolution thereof set to 3/2 or more.

In the third embodiment, the recesses are formed in first thrust ring 151, but may be formed in second thrust ring 161.

In addition, the boring tool attached to the lower end of the tool spindle is not limited to the annular cutter. A twist drill may be used therefor.

With the above embodiments, the present invention is applied to a drilling machine with a portable electromagnetic base. However, it is also applicable to a compact boring machine or an electric drill.

What is claimed is:

1. A boring device comprising:
a casing;
a tool spindle supported in said casing and movable in axial direction thereof, one direction being a feed direction and the other direction being a return direction;
means for biasing said tool spindle in said return direction;
a first thrust ring fixed to said tool spindle and coaxially disposed with respect spindle thereto, said first thrust ring having a substantially hollow cylindrical shape and a track surface having an arcuate cross section facing outwardly thereof and in said return direction;
a second thrust ring concentrically surrounding said first thrust ring and fixed to said casing, said second thrust ring having a substantially hollow cylindrical shape and a track surface facing said track surface of said first thrust ring, said track surface of said second thrust ring having an arcuated cross section facing inwardly thereof and in said feed direction;

a rolling element retaining ring rotatably disposed between said first and second thrust rings and having at least three rolling element receiving bores facing said track surfaces of said first and second thrust rings, said rolling element receiving bores being spaced apart from each other in a circumferential direction of said rolling element retaining ring and being radially extended in said rolling element retaining ring;

rolling elements respectively received in said rolling element receiving bores such that said rolling elements are in rolling contact with said track surfaces of said first and second thrust rings;

receptacles formed in the track surface of one of said first and second thrust rings so as to be arranged in the same circumferentially spaced relation as said rolling element receiving bores such that said receptacles simultaneously receive said rolling elements; and coupling means for causing said rolling element retaining ring to operatively engage and disengage with respect to the other one of said first and second thrust rings, said coupling means comprising (i) notches formed in said rolling element retaining ring, and (ii) engaging means engageable with said notches fixed to said casing in a required position along said tool spindle.

2. The device according to claim 1, wherein said casing has an elongated hole extending along said tool spindle and an inner wall; and said engaging means comprises a guide piece contacting said inner wall of said casing, a bolt extending radially of said rolling element retaining ring and having two ends, one end being threadably fitted in said guide piece, said bolt passing through said elongated hole, and a knob formed on the other end of said bolt for fixing said bolt to said casing in a required position with said guide piece pressed against said inner wall of said casing when said knob is tightened.

3. An apparatus according to claim 2, wherein said engaging means includes a compression spring interposed between said knob and said casing.

* * * * *